(12) United States Patent
Sheng

(10) Patent No.: US 7,878,499 B2
(45) Date of Patent: Feb. 1, 2011

(54) SEPARATING ROLLER AND SHEET SEPARATING MECHANISM USING THE SAME

(75) Inventor: Thomas Sheng, Hsinchu (TW)

(73) Assignee: Auision Inc. (TW)

( * ) Notice: Subject to any disclaimer, the term of this patent is extended or adjusted under 35 U.S.C. 154(b) by 291 days.

(21) Appl. No.: 11/976,417

(22) Filed: Oct. 24, 2007

(65) Prior Publication Data

US 2008/0099296 A1    May 1, 2008

(30) Foreign Application Priority Data

Nov. 1, 2006   (TW) ............................... 95140354 A

(51) Int. Cl.
    *B65H 3/52*   (2006.01)
(52) U.S. Cl. ..................................... 271/121
(58) Field of Classification Search ................ 271/121, 271/124, 125
    See application file for complete search history.

(56) References Cited

U.S. PATENT DOCUMENTS

| | | | |
|---|---|---|---|
| 4,801,134 A | 1/1989 | Yokoyama et al. | |
| 5,029,840 A | 7/1991 | Haga et al. | |
| 5,148,187 A * | 9/1992 | Ono et al. | 347/218 |
| 5,435,538 A | 7/1995 | Billings et al. | |
| 5,996,990 A * | 12/1999 | Kawashima | 271/122 |
| 6,017,031 A * | 1/2000 | Oosawa et al. | 271/121 |
| 6,260,839 B1 * | 7/2001 | Araki et al. | 271/10.11 |
| 6,585,252 B1 * | 7/2003 | Russo et al. | 271/122 |
| 2004/0217544 A1 * | 11/2004 | Hall et al. | 271/233 |

FOREIGN PATENT DOCUMENTS

| | | |
|---|---|---|
| JP | 2004292125 | 10/2004 |
| TW | M280090 | 11/2005 |

* cited by examiner

*Primary Examiner*—Stefanos Karmis
*Assistant Examiner*—Michael C McCullough

(57) ABSTRACT

A separating roller includes a sleeve having a first hollow cylinder, an arm protruding from an outer surface of the sleeve, a shaft assembly having a middle section, disposed inside the sleeve, and two ends on two sides of the middle section, a torque limiting element and two friction rollers. The sleeve and the shaft assembly are hung from a body by the arm. The torque limiting element coils around the middle section and contacts the shaft assembly, and is accommodated within the first hollow cylinder. One portion of the torque limiting element is fixed to an inner surface of the first hollow cylinder to provide a limiting torque to the shaft assembly and to limit rotation of the shaft assembly. The friction rollers are respectively fixed to the two ends of the shaft assembly. Each friction roller has an outer diameter greater than that of the sleeve.

19 Claims, 10 Drawing Sheets

SEPARATING ROLLER AND SHEET SEPARATING MECHANISM USING THE SAME

BACKGROUND OF THE INVENTION

1. Field of Invention

The invention relates to a torque limiter and a separating roller and a sheet separating mechanism using the same, and more particularly to a minimized torque limiter, which may be conveniently maintained, and a separating roller and a sheet separating mechanism using the same.

2. Related Art

FIG. 1 is a schematic illustration showing a first conventional sheet separating mechanism. Referring to FIG. 1, the sheet separating mechanism includes a sheet transporting roller 101, a friction pad 102 and a spring 103. Sheets S are disposed between the sheet transporting roller 101 and the friction pad 102. The spring 103 presses the friction pad 102 toward the sheet transporting roller 101. Thus, when many sheets enter a passageway 104 between the sheet transporting roller 101 and the friction pad 102, the friction pad 102 stops the sheet S contacting therewith to achieve the sheet separating effect. However, when the sheet separating mechanism is transporting the last sheet, the sheet rubs against the friction pad 102 for a long period of time so that the sheet or the friction pad tends to wear.

FIG. 2 is a schematic illustration showing a second conventional sheet separating mechanism. Referring to FIG. 2, the sheet separating mechanism includes a sheet transporting roller 201, a separating roller 202, a spring 203 and a torque limiter 204. The torque limiter 204 is fixed to a shaft 205 and mounted in the separating roller 202 to provide a torsional force to achieve the sheet separating effect. In this sheet separating mechanism, the separating roller 202 needs to accommodate the torque limiter 204, so its size cannot be reduced. In addition, the process of disassembling the torque limiter 204 is complicated. Thus, the user or the maintenance man may feel inconvenient when he or she is replacing the separating roller 202.

FIG. 3 is a schematic illustration showing a third conventional separating roller assembly. Referring to FIG. 3, the separating roller assembly includes a separating roller frame 301, a torque limiter 302 and a separating roller 303. The separating roller frame 301 is fixed to a shaft 304 and connected to the torque limiter 302. The torque limiter 302 is connected to the separating roller 303 to provide a torsional force to achieve the sheet separating effect. However, the user or the maintenance man may feel inconvenient when he or she is replacing the separating roller 303, and the width of the separating roller assembly cannot be effectively reduced so that the product cannot be miniaturized.

SUMMARY OF THE INVENTION

It is therefore an object of the invention to provide a minimized torque limiter, which may be conveniently maintained, and a separating roller and a sheet separating mechanism using the same.

To achieve the above-identified object, the invention provides a torque limiter. The torque limiter includes a shaft assembly, a torque limiting element and two friction rollers. The shaft assembly has a middle section and two ends on two sides of the middle section. The torque limiting element coils around the middle section of the shaft assembly and contacts the shaft assembly. One portion of the torque limiting element is connected to a housing to provide a limiting torque to the shaft assembly and to limit rotation of the shaft assembly. The two friction rollers are respectively fixed to the two ends of the shaft assembly.

The invention also provides a separating roller including a sleeve, an arm, a shaft assembly, a torque limiting element and two friction rollers. The sleeve has a first hollow cylinder. The arm, protruding from the sleeve, connects the sleeve to a body. The shaft assembly has a middle section, disposed inside the sleeve, and two ends on two sides of the middle section. The sleeve and the shaft assembly are hung from the body by the arm. The torque limiting element coils around the middle section of the shaft assembly and contacts the shaft assembly, and is accommodated within the first hollow cylinder of the sleeve. One portion of the torque limiting element is fixed to an inner surface of the first hollow cylinder of the sleeve to provide a limiting torque to the shaft assembly and to limit rotation of the shaft assembly. The two friction rollers are respectively fixed to the two ends of the shaft assembly. Each of the friction rollers has an outer diameter greater than an outer diameter of the sleeve.

The invention further provides a sheet separating mechanism including a sheet transporting roller and a separating roller. The separating roller includes a sleeve, an arm, a shaft assembly, a torque limiting element and two friction rollers. The sleeve has a first hollow cylinder. The arm, protruding from the sleeve, connects the sleeve to a body. The shaft assembly has a middle section, disposed inside the sleeve, and two ends on two sides of the middle section. The sleeve and the shaft assembly are hung from the body by the arm. The torque limiting element coils around the middle section of the shaft assembly and contacts the shaft assembly, and is accommodated within the sleeve. One portion of the torque limiting element is fixed to an inner surface of the first hollow cylinder of the sleeve to provide a limiting torque to the shaft assembly to limit rotation of the shaft assembly. The two friction rollers are respectively fixed to the two ends of the shaft assembly. Each of the friction rollers has an outer diameter greater than an outer diameter of the sleeve. The sheet transporting roller is driven to rotate by a power source and contacts the friction rollers to generate an external force, which is applied to the friction rollers and the shaft assembly and tends to rotate the friction rollers and the shaft assembly. A pressure presses the separating roller toward the sheet transporting roller.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
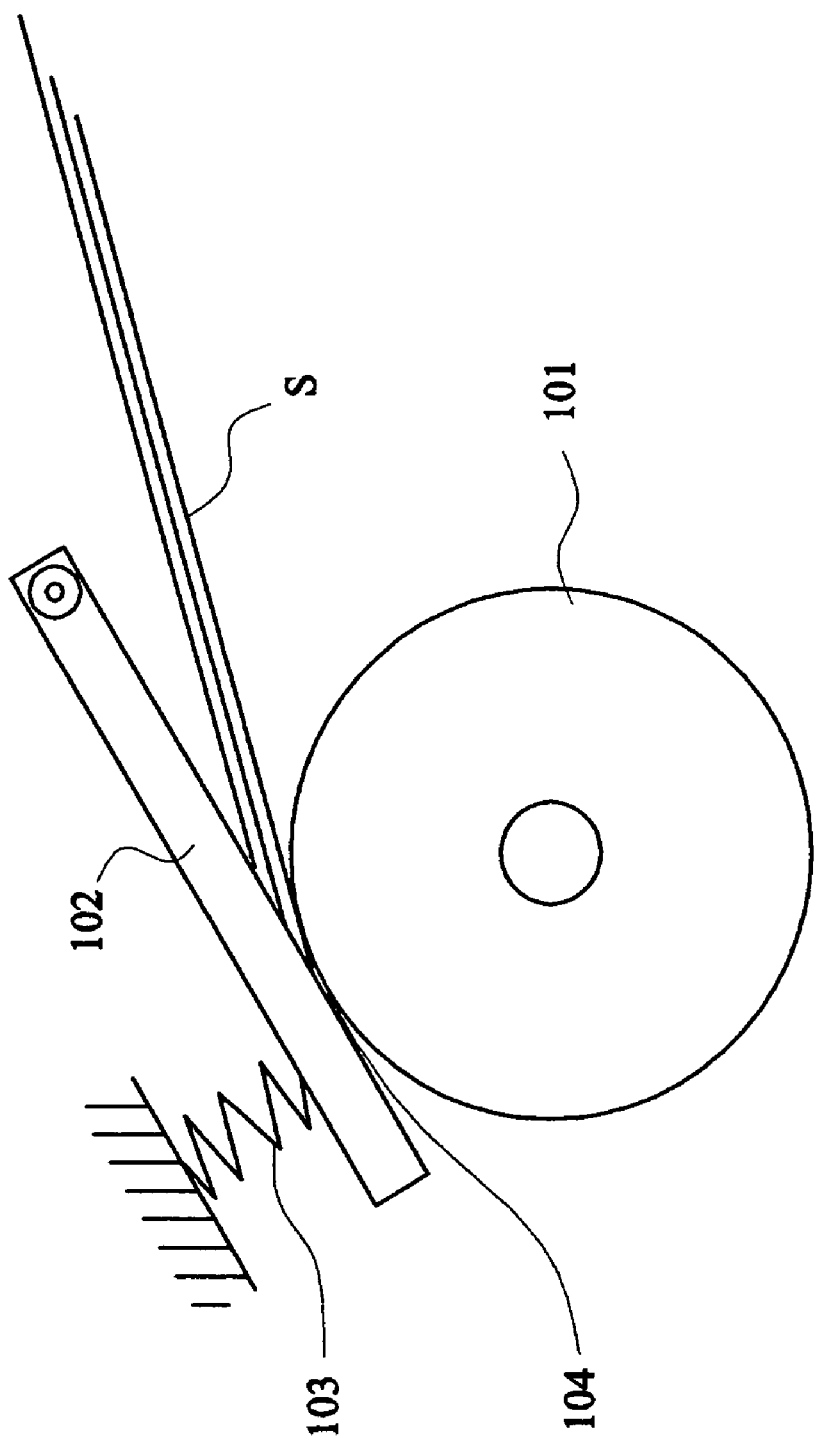
FIG. 1 is a schematic illustration showing a first conventional sheet separating mechanism.
Figure 2:
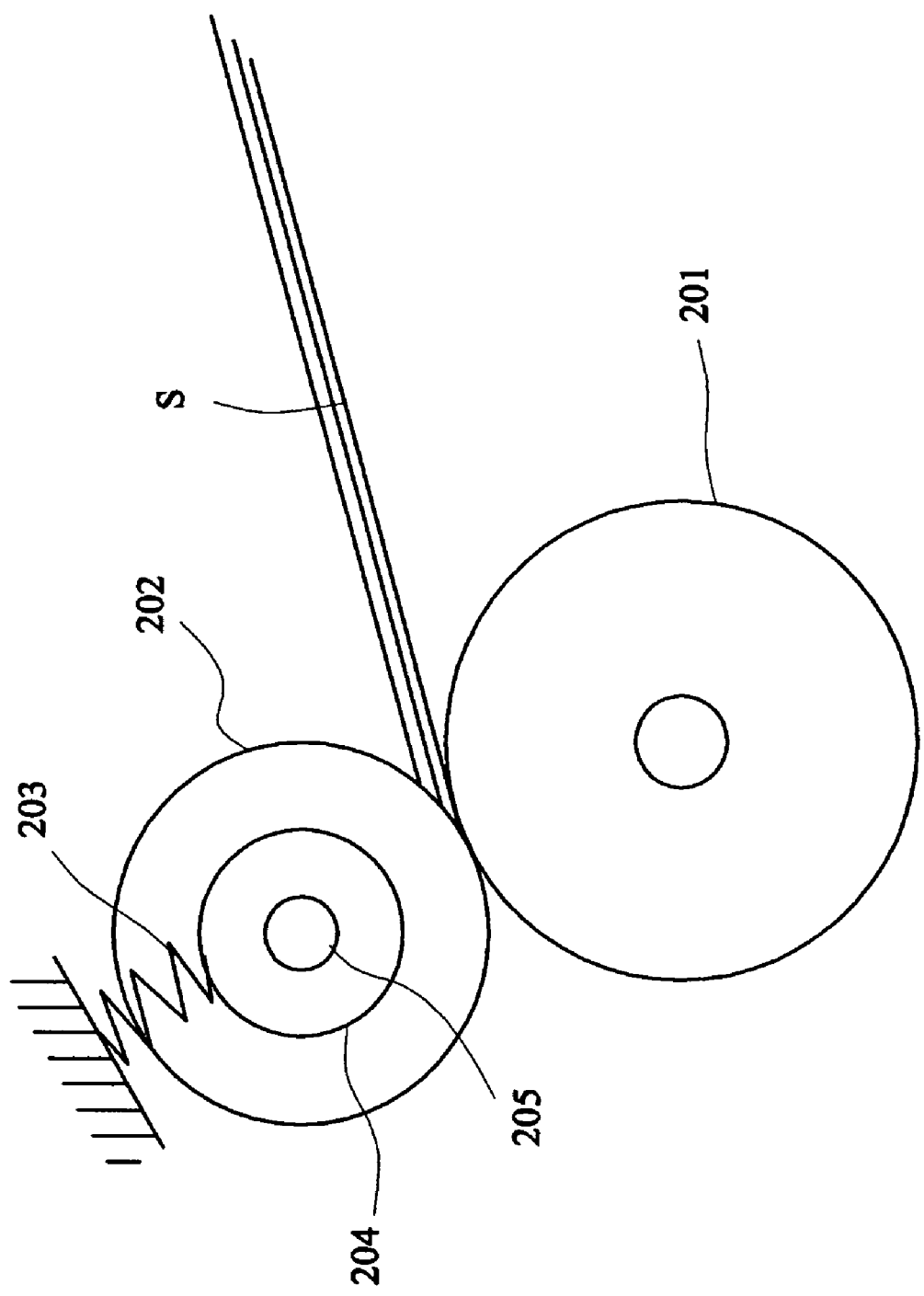
FIG. 2 is a schematic illustration showing a second conventional sheet separating mechanism.
Figure 3:
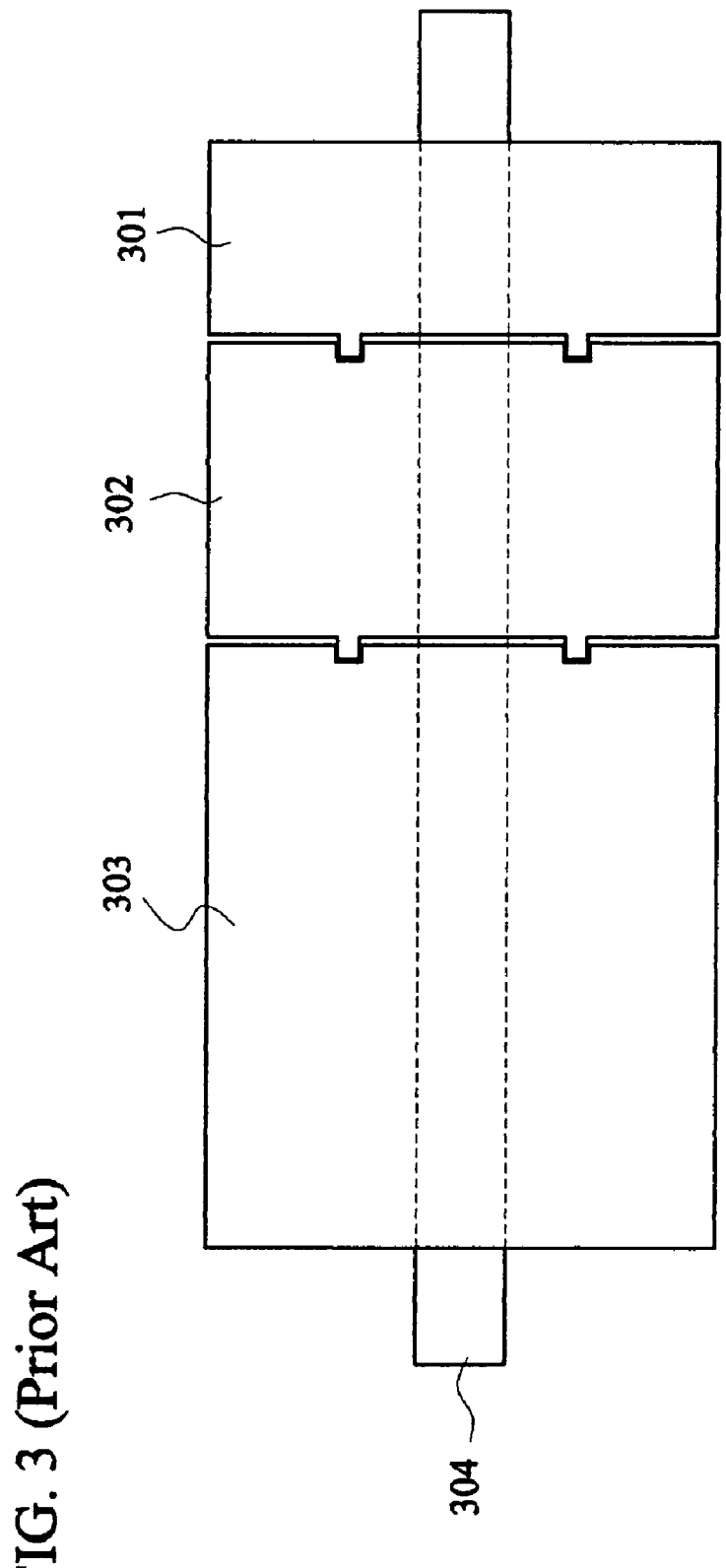
FIG. 3 is a schematic illustration showing a third conventional separating roller assembly.
Figure 4:
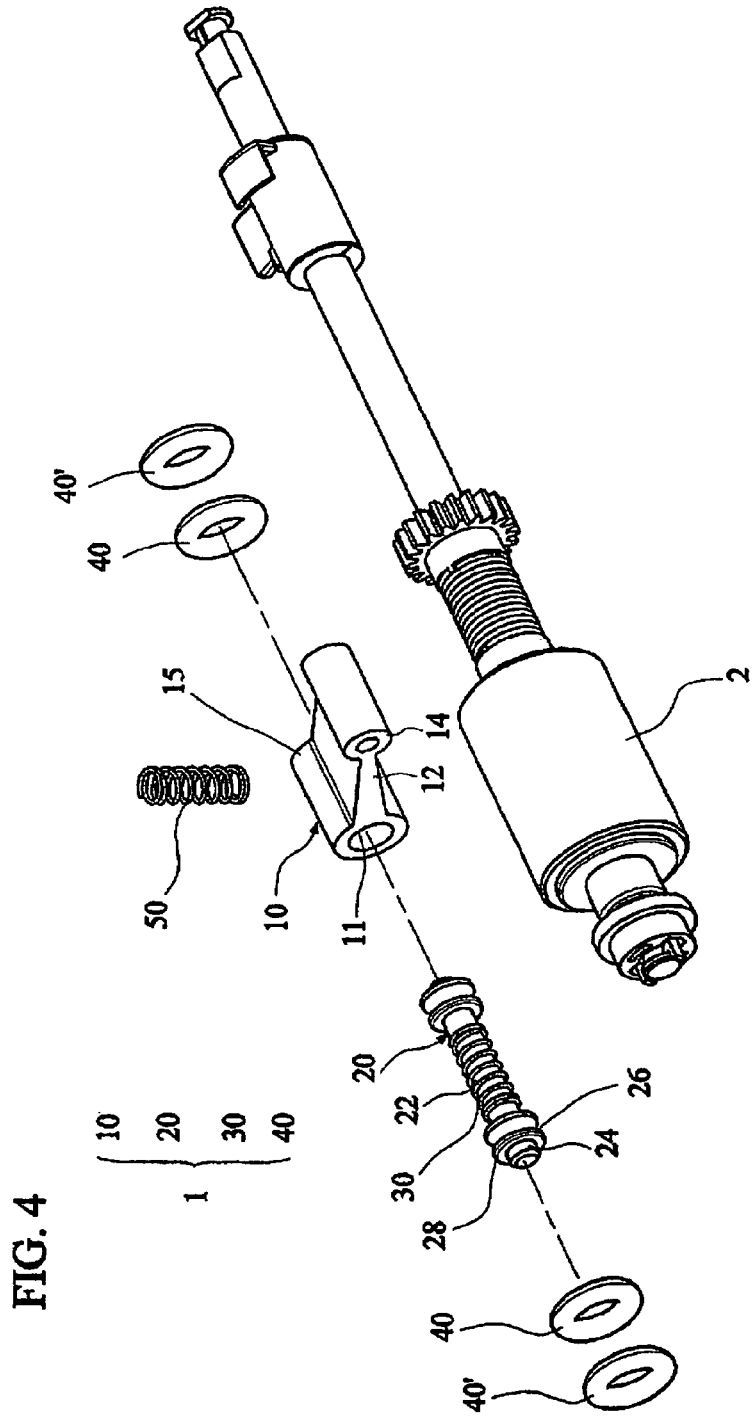
FIG. 4 is a pictorially exploded view showing a sheet separating mechanism according to a first embodiment of the invention.
Figure 5:
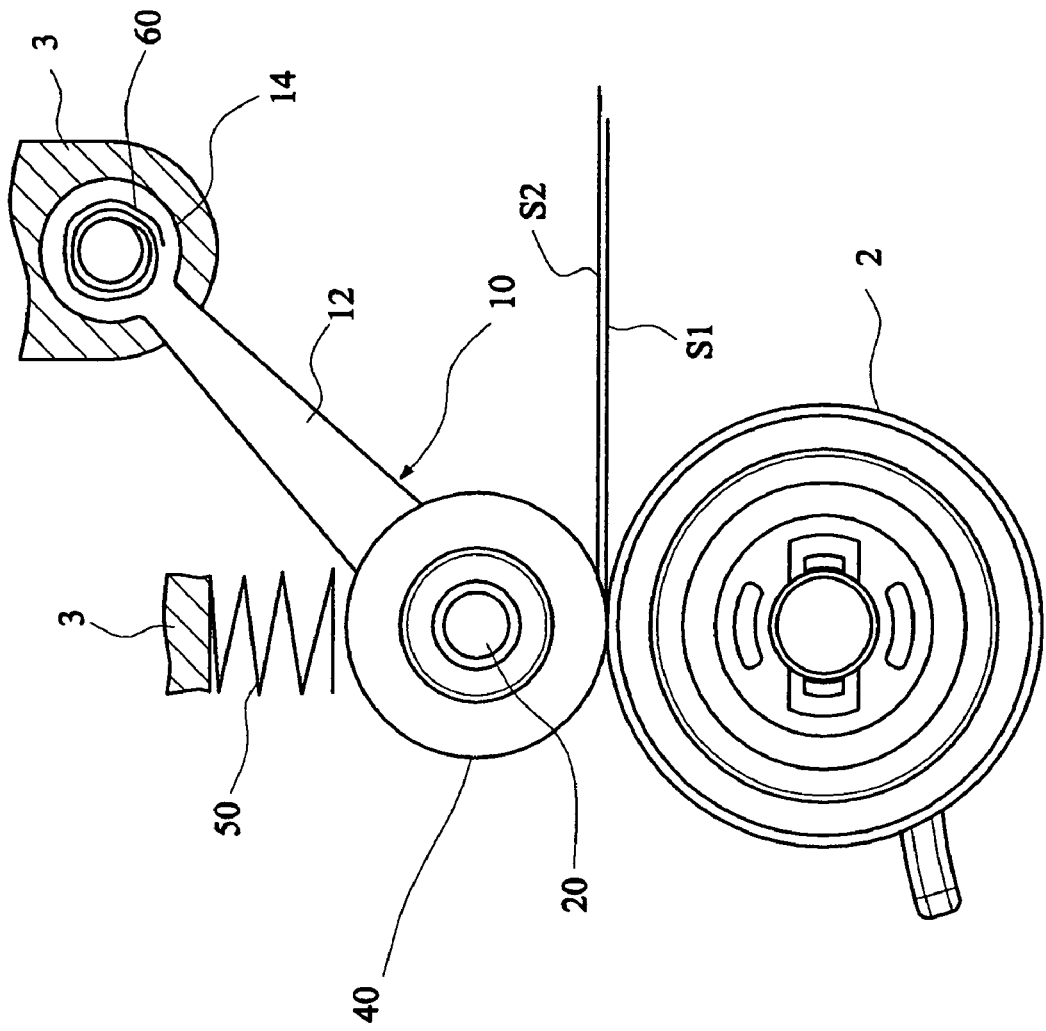
FIG. 5 is a side view showing the sheet separating mechanism according to the first embodiment of the invention.
Figure 6:
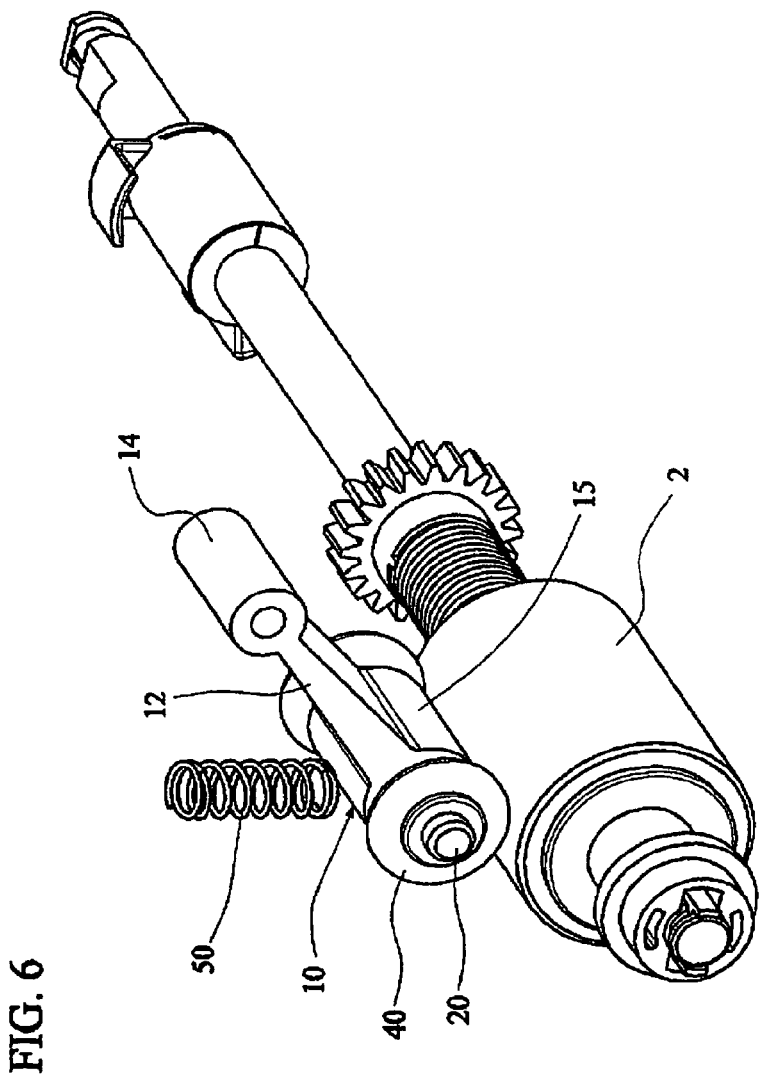
FIG. 6 is a pictorially assembled view showing the sheet separating mechanism according to the first embodiment of the invention.

FIGS. 4 to 6 are respectively a pictorially exploded view, a side view and a pictorially assembled view showing a sheet separating mechanism according to a first embodiment of the invention. Referring to FIGS. 4 to 6, the sheet separating mechanism of this embodiment is assembled on a body 3 and includes a sheet transporting roller 2 and a separating roller 1. The separating roller 1 includes a sleeve 10, a shaft assembly 20, a torque limiting element 30 and two friction rollers 40.

The sleeve 10 may be referred to as a separating roller frame having a first hollow cylinder 15 and an arm 12 for connecting the separating roller 1 to the body 3. One end of the arm 12 is formed with a second hollow cylinder 14, through which the separating roller 1 is connected to the body 3. This second hollow cylinder 14 serves as a fulcrum for the arm 12 to swing. Alternatively, the arm 12 may be regarded as pertaining to the separating roller 1. The arm 12, protruding from the sleeve 10, connects the sleeve 10 to the body 3. The second hollow cylinder 14 is attached to the body 3 and the sleeve 10 and the shaft assembly 20 are hung from the body 3 by the arm 12.

Figure 7:
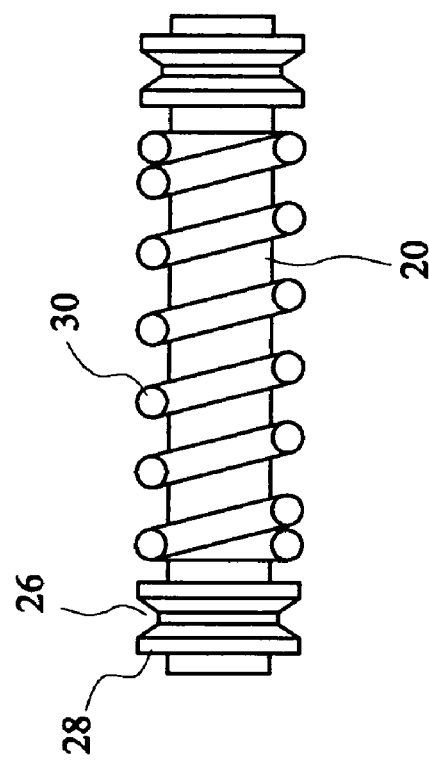
FIG. 7 is a schematic illustration showing an example of a shaft assembly of the invention.
Figure 8:
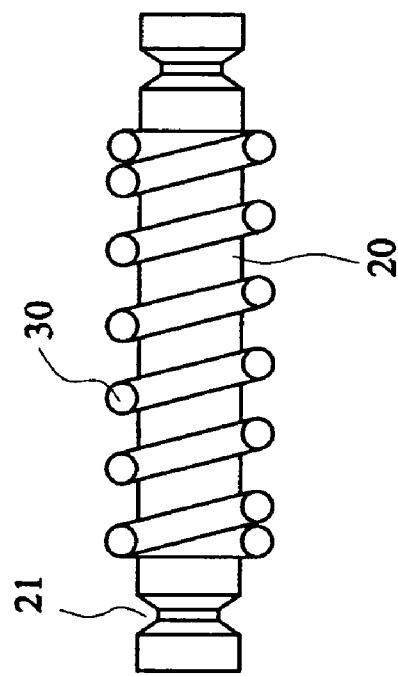
FIG. 8 is a schematic illustration showing another example of the shaft assembly of the invention.

The shaft assembly 20 has a middle section 22, disposed inside the sleeve 10, and two ends 24 on two sides of the middle section 22. Each of the two ends 24 of the shaft assembly 20 is formed with an annular groove 21 for accommodating the friction roller 40, as shown in FIG. 8. Alternatively, two adapters 28 may be mounted on the two ends 24 of the shaft assembly 20, and each of the adapters 28 is formed with an annular groove 26, as shown in FIG. 7. The adapter 28 may be made of a plastic material.

The torque limiting element 30 is a helical spring, which coils around the middle section 22 of the shaft assembly 20 and contacts the shaft assembly 20, and is accommodated within the first hollow cylinder 15 of the sleeve 10. In addition, one portion of the torque limiting element 30 is fixed town inner surface 11 of the first hollow cylinder 15 of the sleeve 10 to provide a limiting torque to the shaft assembly 20 to limit rotation of the shaft assembly 20. Alternatively, the sleeve 10 and the fixed body 3 (e.g., the stationary portion relative to the ground) for fixing the sleeve 10 may be referred to as a housing, such as a housing of an automatic document feeder. In this case, one portion of the torque limiting element 30 is connected to the housing. However, the torque limiting element 30 is not particularly limited thereto, and any elastomer capable of applying a normal force to a surface of the shaft assembly may achieve the effect of the invention. Each of the friction rollers 40 may be an elastic ring, a non-elastic ring, or an O-ring or an ordinary rubber wheel having a narrow rim width and a lower manufacturing cost. The friction rollers 40 are respectively fixed to the two ends 24 of the shaft assembly 20, and an outer diameter of the friction roller 40 is greater than an outer diameter of the sleeve 10. In addition, the two friction rollers 40 contact the sheet transporting roller 2. It is to be noted that the separating roller 1 may further include two auxiliary friction rollers 40', which are respectively fixed to the two ends 24 of the shaft assembly 20 and abut against the friction rollers 40, for providing auxiliary effects to the friction rollers 40.

The sheet transporting roller 2 is driven to rotate, by a power source, to generate an external force, which is applied to the friction rollers 40 and the shaft assembly 20 and tends to rotate the friction rollers 40 and the shaft assembly 20, wherein a pressure presses the separating roller toward the sheet transporting roller.

In this example, the self-weight of the separating roller 1 may be utilized to make the separating roller 1 press against the sheet transporting roller 2. Alternatively, the sheet separating mechanism may further include a compression spring 50, contacting the separating roller 1 and the housing of the sheet separating mechanism, for applying the pressure to press the separating roller 1 toward the sheet transporting roller 2.

In addition to the above-mentioned pressing methods, a torsional spring 60 connected to the second hollow cylinder 14 and the housing may also be adopted to apply a torsional force to the arm 12 to provide the pressure for pressing the separating roller 1 toward the sheet transporting roller 2. Alternatively, the arm 12 itself is an elastomer or includes a resilient member. Thus, the pressure may be applied to press the friction rollers 40 of the separating roller 1 in a direction toward the sheet transporting roller 2 according to the elasticity of the arm 12 and the self-weight of the separating roller 1.

In the sheet separating mechanism of this invention, the outer diameter of the friction roller 40 is larger than the outer diameter of the sleeve 10, so the sleeve 10 does not contact the sheet transporting roller 2 but only the friction rollers 40 contact the sheet transporting roller 2. Thus, only the friction rollers 40 may be worn out and need to be replaced without the requirement of the complicated step. Instead, the old friction rollers 40 may be easily removed from the two ends of the shaft assembly 20 and the new friction rollers 40 may be easily mounted on the two ends of the shaft assembly 20. When the O-rings serve as the friction rollers, no tool has to be used, and the O-ring may be elastically removed according to its elasticity. In addition, the torque limiting element 30 directly surrounds the shaft assembly 20, so the outer diameter of the overall separating roller may be effectively reduced.

How the sheet-separating effect of the sheet separating mechanism of the invention can be achieved will be described with reference to FIG. 5. The sheet transporting roller 2 is rotated to rotate the friction rollers 40 of the separating roller 1. Assume that two sheets S1 and S2 simultaneously enter the passageway between the separating roller 1 and the sheet transporting roller 2. In this case, the sheet transporting roller 2 contacts the sheet S1 and the friction roller 40 contacts the sheet S2. The sheet transporting roller 2 continuously moves the sheet S1 forward according to the friction force between the sheet transporting roller 2 and the sheet S1. Whether the friction roller 40 is rotated or not is determined according to the force of the sheet S1 for driving the friction rollers 40 through the sheet S2. The torque limiting element 30 is specially configured to overcome the force of the sheet S1 for driving the friction rollers 40 through the sheet S2 but not to overcome the force of the sheet transporting roller 2 for driving the friction rollers 40. Thus, the sheet S2 is fixed by the friction roller 40 or even the sheet S2 is moved back by the friction rollers 40 through a design of an energy storage mechanism (e.g., the elasticity of the friction roller 40 itself). Thus, the sheet S1 slides relative to the sheet S2 to prevent the sheet S2 from entering the sheet passageway, and the sheet separating effect is thus achieved.

Figure 9:
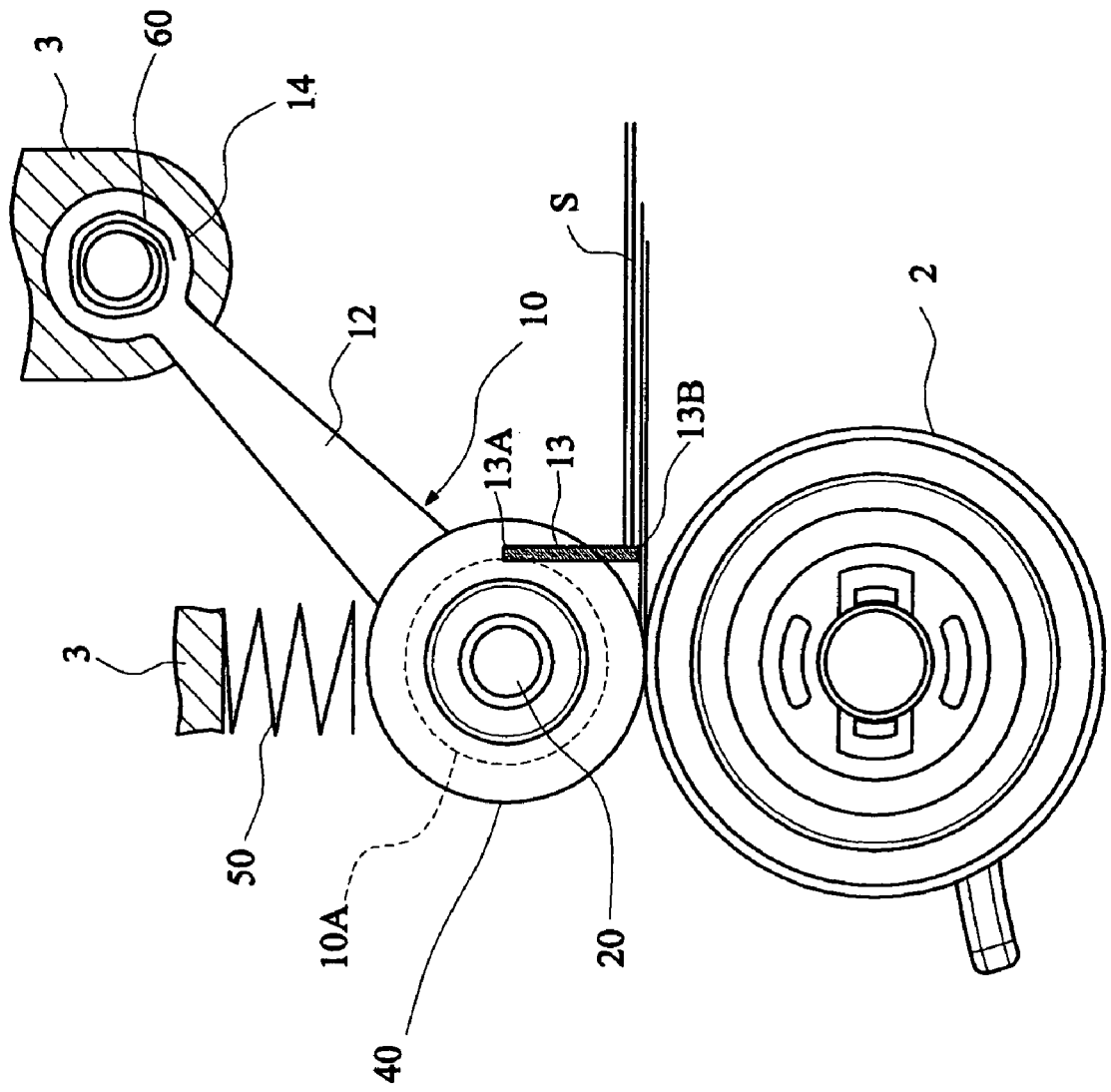
FIG. 9 is a side view showing a sheet separating mechanism according to a second embodiment of the invention.

FIG. 9 is a side view showing a sheet separating mechanism according to a second embodiment of the invention. Referring to FIG. 9, the separating roller 1 of this embodiment further includes a sheet stopping element 13, such as a sheet-stopping pad, having a first end 13A, which is fixed to an outer surface 10A of the sleeve 10 in parallel with the shaft assembly 20, and a second end 13B, which is opposite the first end 13A and kept free but extends in a direction toward the sheet transporting roller 2 and may contact or may not contact the sheet transporting roller 2. The sheet stopping element mainly functions to stop a few sheets S before the sheet separating procedure so as to increase the efficiency of the sheet separating mechanism. That is, the sheet stopping element stops at least one sheet S from entering the passageway between the separating roller 1 and the sheet transporting roller 2.

Figure 10:
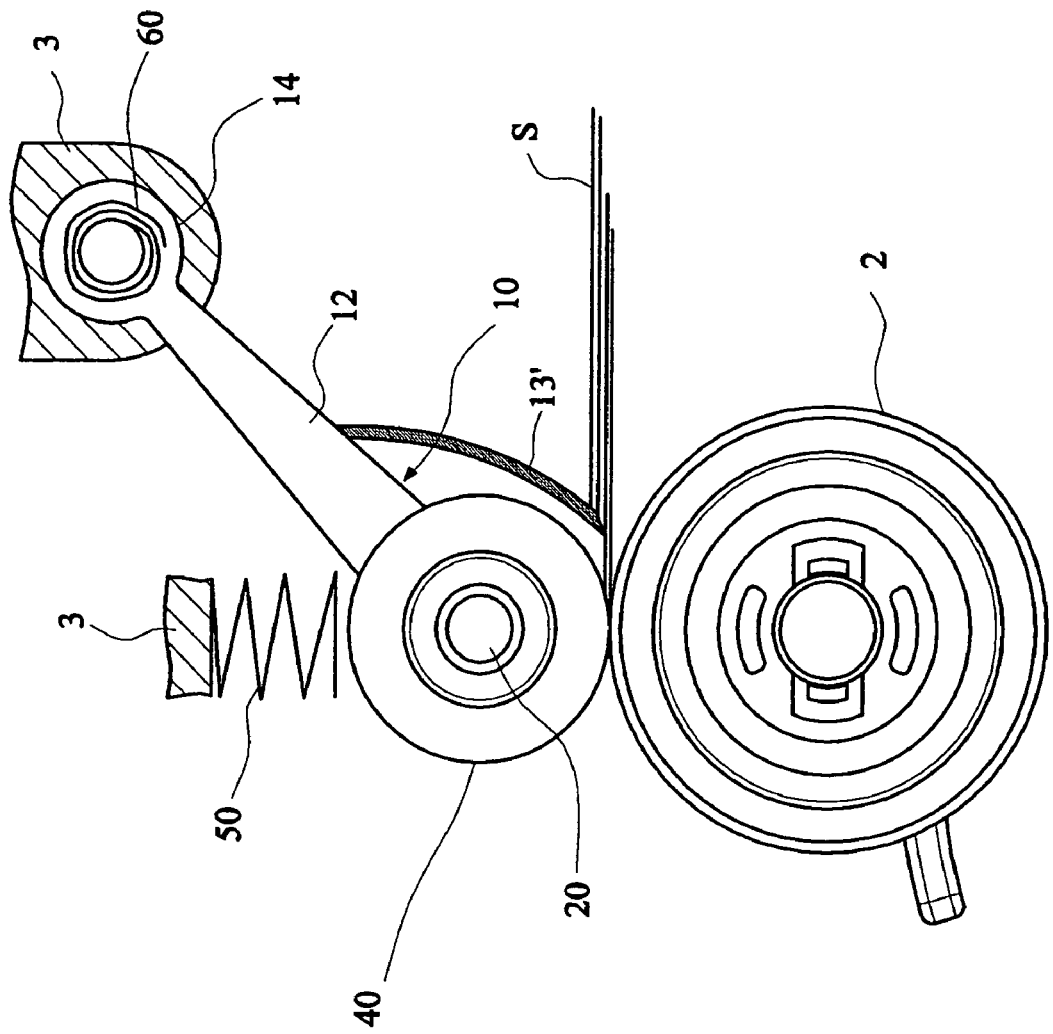
FIG. 10 is a side view showing a sheet separating mechanism according to a third embodiment of the invention.

FIG. 10 is a side view showing a sheet separating mechanism according to a third embodiment of the invention. Referring to FIG. 10, the separating roller 1 of this embodiment further includes a sheet stopping element 13 having a first end 13A, which is fixed to the arm 12, and a second end 13B, which is opposite the first end 13A and kept free. The sheet stopping element stops at least one sheet S from entering the passageway between the separating roller 1 and the sheet transporting roller 2 when multiple sheets are being fed.

Figure 11:
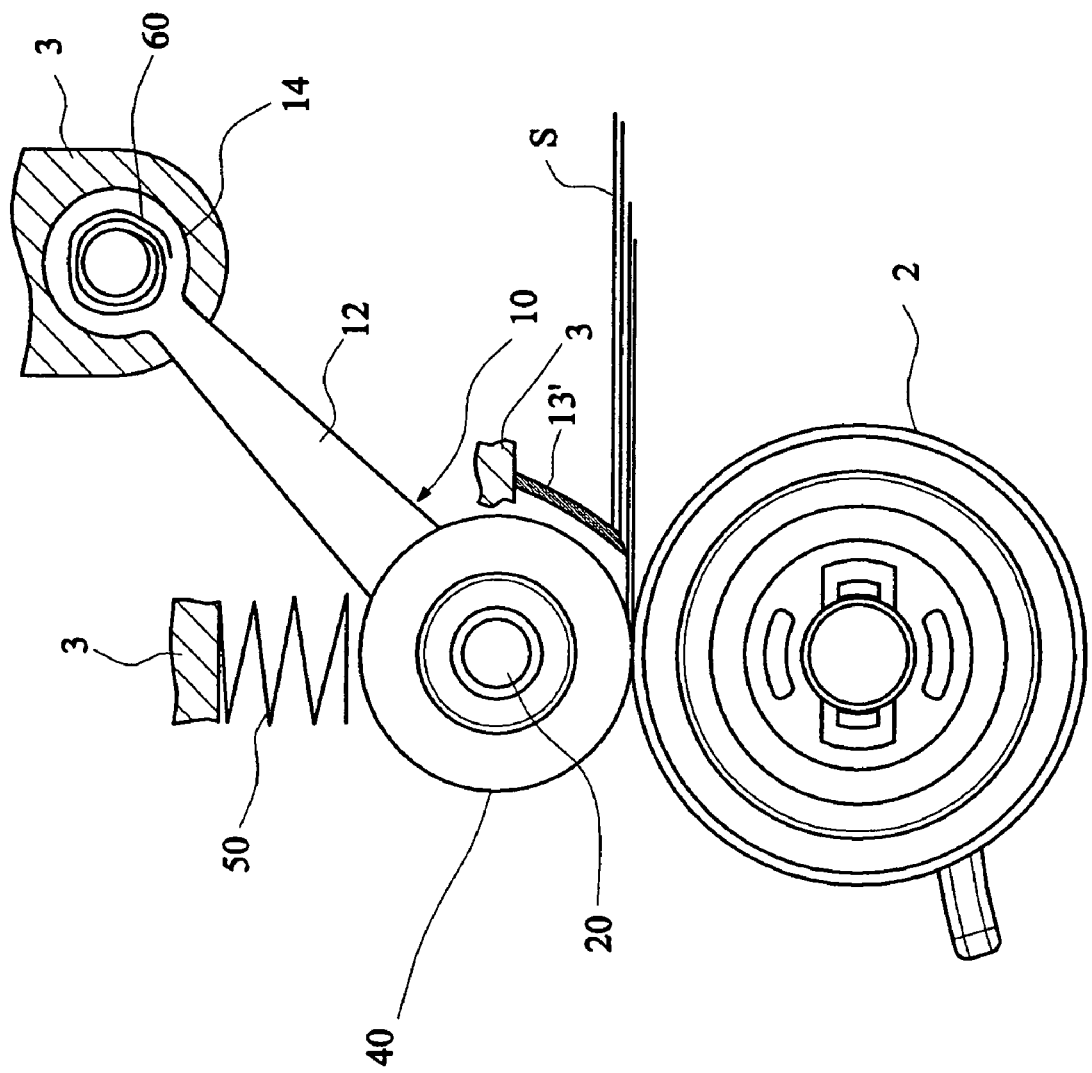
FIG. 11 is a side view showing a sheet separating mechanism according to a fourth embodiment of the invention.

FIG. 11 is a side view showing a sheet separating mechanism according to a fourth embodiment of the invention. Referring to FIG. 11, the separating roller 1 of this embodiment further includes a sheet stopping element 13 having a first end 13A, which is fixed to the body 3, and a second end 13B, which is opposite the first end 13A and kept free. The second end 13B extends in a direction toward the sheet transporting roller 2 and may contact or may not contact the sheet transporting roller 2. Similarly, the sheet stopping element 13 stops at least one sheet S from entering the passageway between the separating roller 1 and the sheet transporting roller 2 when multiple sheets are being fed.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A separating roller, comprising:
   a sleeve having a first hollow cylinder;
   an arm, protruding from the sleeve, for connecting the sleeve to a body,
   a shaft assembly having a middle section, disposed inside the sleeve, and two ends on two sides of the middle section, wherein the sleeve and the shaft assembly are hung from the body by the arm;
   a torque limiting element, which coils around the middle section of the shaft assembly and contacts the shaft assembly, and is accommodated within the first hollow cylinder of the sleeve, wherein one portion of the torque limiting element is fixed to an inner surface of the first hollow cylinder of the sleeve to provide a limiting torque to the shaft assembly and to limit rotation of the shaft assembly; and
   two friction rollers respectively fixed to the two ends of the shaft assembly, wherein each of the friction rollers has an outer diameter greater than an outer diameter of the sleeve.

2. The separating roller according to claim 1, wherein each of the two ends of the shaft assembly is formed with an annular groove for accommodating the friction roller.

3. The separating roller according to claim 1, wherein annular grooves for accommodating the friction rollers are respectively formed on two adapters on the two ends of the shaft assembly.

4. The separating roller according to claim 1, wherein the torque limiting element is an elastomer for applying a normal force to a surface of the shaft assembly.

5. The separating roller according to claim 1, wherein one end of the aim is formed with a second hollow cylinder for attaching to the body.

6. The separating roller according to claim 1, further comprising a sheet stopping element having a first end, which is fixed to the arm, and a second end, which is opposite the first end and kept free.

7. The separating roller according to claim 1, further comprising a sheet stopping element having a first end, which is fixed to an outer surface of the sleeve in parallel to the shaft assembly, and a second end, which is opposite the first end and kept free.

8. The separating roller according to claim 1, further comprising two auxiliary friction rollers, which are respectively fixed to the two ends of the shaft assembly and abut against the friction rollers.

9. A sheet separating mechanism mounted on a body, the sheet separating mechanism comprising:
   a separating roller, which comprises
      a sleeve having a first hollow cylinder;
      an arm, protruding from the sleeve, for connecting the sleeve to the body;
      a shaft assembly having a middle section, disposed inside the sleeve, and two ends on two sides of the middle section, wherein the sleeve and the shaft assembly are hung from the body by the arm;
      a torque limiting element, which coils around the middle section of the shaft assembly and contacts the shaft assembly, and is accommodated within the first hollow cylinder of the sleeve, wherein one portion of the torque limiting element is fixed to an inner surface of the first hollow cylinder of the sleeve to provide a limiting torque to the shaft assembly to limit rotation of the shaft assembly; and
      two friction rollers respectively fixed to the two ends of the shaft assembly, wherein each of the friction rollers has an outer diameter greater than an outer diameter of the sleeve; and
   a sheet transporting roller, which is driven to rotate by a power source and contacts with the friction rollers to generate an external force, which is applied to the friction rollers and the shaft assembly and tends to rotate the friction rollers and the shaft assembly,
   wherein a pressure presses the separating roller toward the sheet transporting roller.

10. The sheet separating mechanism according to claim 9, further comprising:

a compression spring, contacting with the separating roller, for applying the pressure to press the separating roller toward the sheet transporting roller.

11. The sheet separating mechanism according to claim 9, wherein each of the two ends of the shaft assembly is formed with an annular groove for accommodating the friction roller.

12. The sheet separating mechanism according to claim 9, wherein annular grooves for accommodating the friction rollers are respectively formed on two adapters on the two ends of the shaft assembly.

13. The sheet separating mechanism according to claim 9, wherein the torque limiting element is an elastomer for applying a normal force to a surface of the shaft assembly.

14. The sheet separating mechanism according to claim 9, wherein one end of the arm has a second hollow cylinder, and the separating roller is connected to the body through the second hollow cylinder.

15. The sheet separating mechanism according to claim 14, further comprising:
   a torsional spring, connected to the second hollow cylinder, for applying the pressure to the arm to press the separating roller toward the sheet transporting roller.

16. The sheet separating mechanism according to claim 9, wherein the arm comprises a resilient member, and the arm applies the pressure to press the separating roller toward the sheet transporting roller.

17. The sheet separating mechanism according to claim 9, further comprising a sheet stopping element having a first end, which is fixed to the separating roller, and a second end, which is opposite the first end and extends in a direction toward the sheet transporting roller.

18. The sheet separating mechanism according to claim 9, further comprising a sheet stopping element having a first end, which is fixed to the body, and a second end, which is opposite the first end and extends in a direction toward the sheet transporting roller.

19. The sheet separating mechanism according to claim 9, further comprising two auxiliary friction rollers, which are respectively fixed to the two ends of the shaft assembly and abut against the friction rollers.

* * * * *

UNITED STATES PATENT AND TRADEMARK OFFICE
CERTIFICATE OF CORRECTION

| | | |
|---|---|---|
| PATENT NO. | : 7,878,499 B2 | Page 1 of 1 |
| APPLICATION NO. | : 11/976417 | |
| DATED | : February 1, 2011 | |
| INVENTOR(S) | : Thomas Sheng | |

It is certified that error appears in the above-identified patent and that said Letters Patent is hereby corrected as shown below:

Title Page, Item (73) Assignee: should be "Avision Inc." not "Auision Inc."

Signed and Sealed this
Twenty-sixth Day of April, 2011

David J. Kappos
*Director of the United States Patent and Trademark Office*